United States Patent
Sato et al.

(10) Patent No.: US 8,142,931 B2
(45) Date of Patent: Mar. 27, 2012

(54) NONAQUEOUS ELECTROLYTE SECONDARY BATTERY AND METHOD OF MANUFACTURING NEGATIVE ELECTRODE THEREOF

(75) Inventors: Toshitada Sato, Osaka (JP); Daisuke Suetsugu, Osaka (JP); Katsumi Kashiwagi, Nara (JP); Kazuyoshi Honda, Osaka (JP)

(73) Assignee: Panasonic Corporation, Osaka (JP)

( * ) Notice: Subject to any disclaimer, the term of this patent is extended or adjusted under 35 U.S.C. 154(b) by 394 days.

(21) Appl. No.: 12/088,323

(22) PCT Filed: Oct. 11, 2007

(86) PCT No.: PCT/JP2007/069827
§ 371 (c)(1),
(2), (4) Date: Mar. 27, 2008

(87) PCT Pub. No.: WO2008/047668
PCT Pub. Date: Apr. 24, 2008

(65) Prior Publication Data
US 2010/0151322 A1    Jun. 17, 2010

(30) Foreign Application Priority Data

Oct. 19, 2006 (JP) .................................. 2006-284533

(51) Int. Cl.
*H01M 4/13* (2010.01)
*H01M 4/58* (2010.01)

(52) U.S. Cl. ................. 429/218.1; 429/231.95; 427/58; 252/182.1

(58) Field of Classification Search .................. 429/209, 429/218.1; 427/123, 124; 252/182.1
See application file for complete search history.

(56) References Cited

U.S. PATENT DOCUMENTS

| | | | |
|---|---|---|---|
| 6,489,062 B1 | 12/2002 | Watanabe et al. | |
| 2006/0099507 A1* | 5/2006 | Kogetsu et al. | 429/218.1 |
| 2006/0121351 A1* | 6/2006 | Sato et al. | 429/231.95 |

FOREIGN PATENT DOCUMENTS

| | | |
|---|---|---|
| JP | 2001-148242 | 5/2001 |
| JP | 2002-083594 | 3/2002 |
| JP | 2002-279974 | 9/2002 |
| JP | 2003-017040 | 1/2003 |
| JP | 2003-017040 A | 1/2003 |
| JP | 2003017040 A * | 1/2003 |
| JP | 2005-038720 | 2/2005 |
| JP | 2005-063805 | 3/2005 |
| JP | 2005063805 A * | 3/2005 |
| JP | 2005-196970 | 7/2005 |
| JP | 2005196970 A * | 7/2005 |

OTHER PUBLICATIONS

M. Miyachi et al., "Analysis of SiO Anodes for Lithium-Ion Batteries," Journal of the Electrochemistry Society, 152 (10), A2089-A2091 (2005).
Korean Office Action issued in Korean Patent Application No. KR 10-2008-7006640 dated Feb. 27, 2010.

* cited by examiner

*Primary Examiner* — Ula C Ruddock
*Assistant Examiner* — Heng Chan
(74) *Attorney, Agent, or Firm* — McDermott Will & Emery LLP

(57) ABSTRACT

A method of manufacturing a negative electrode for a nonaqueous electrolyte secondary battery includes the following three steps of:
A) fabricating the negative electrode by depositing a negative electrode active material on a current collector;
B) heat-treating the negative electrode; and
C) imparting lithium to the negative electrode active material after the B step.

9 Claims, 3 Drawing Sheets

NONAQUEOUS ELECTROLYTE SECONDARY BATTERY AND METHOD OF MANUFACTURING NEGATIVE ELECTRODE THEREOF

RELATED APPLICATIONS

This application is the U.S. National Phase under 35 U.S.C. §371 of International Application No. PCT/JP2007/069827, filed on Oct. 11, 2007, which in turn claims the benefit of Japanese Application No. 2006-284533, filed on Oct. 19, 2006, the disclosures of which Applications are incorporated by reference herein.

TECHNICAL FIELD

The present invention relates to a method of manufacturing a negative electrode of a nonaqueous electrolyte secondary battery, and to a nonaqueous electrolyte secondary battery using the negative electrode.

BACKGROUND ART

With the recent rapid advancement of portable and cordless electronic equipment, there are growing demands for downsized and lightweight nonaqueous electrolyte secondary batteries having larger energy density as a power supply for driving such equipment. In addition, technical development has been accelerating not only in consumer applications but also in large secondary batteries for power storage systems and electric vehicles that require long-term durability and safety. From these viewpoints, there are growing expectations for a nonaqueous electrolyte secondary battery having higher voltage and larger energy density, particularly for a lithium secondary battery, as a power supply for electronic equipment, a power storage system, or an electric vehicle.

A nonaqueous electrolyte secondary battery includes a positive electrode, a negative electrode, a separator disposed therebetween, and a nonaqueous electrolyte. The separator is made primarily of a polyolefin microporous membrane. For the nonaqueous electrolyte, a liquid nonaqueous electrolyte (nonaqueous electrolyte solution) containing a lithium salt, e.g. $LiBF_4$ and $LiPL_6$, dissolved in an aprotic organic solvent is used. For a positive electrode active material, a lithium cobalt oxide (e.g. $LiCoO_2$) that has high potential to lithium and excellent safety, and is relatively easily synthesized is used. For a negative electrode active material, various carbon materials, such as graphite, are used. A nonaqueous electrolyte secondary battery structured as above is put to practical use.

Theoretically, graphite to be used as the negative electrode active material is capable of storing one lithium atom per six carbon atoms. Thus, the theoretical capacity density of the graphite is 372 mAh/g. However, a loss of capacity due to irreversible capacity decreases the actual discharge capacity density to approximately 310-330 mAh/g. For this reason, it is basically difficult to obtain a carbon material capable of storing and releasing lithium ions at a capacity density equal to or higher than this range.

Thus, in the demand for batteries having a much larger energy density, silicon (Si), tin (Sn), and germanium (Ge) alloyable with lithium, and oxides and alloys thereof are expected as a negative electrode active material having a large theoretical capacity density. Among these materials, particularly inexpensive Si and oxides thereof are widely studied.

However, when Si, Sn, and Ge, the oxides and alloys thereof storing lithium ions, the crystal structures thereof change and the volumes are increased. When the negative electrode active material greatly expands during charging, contact failure caused between the negative electrode active material and the current collector shortens the charge/discharge cycle life. To address this problem, the following proposals are made.

For example, a method of forming a thin film of negative electrode active material on a current collector is proposed to improve the contact failure between the negative electrode active material and the current collector caused by expansion (for example in Patent Document 1). Further, a method of forming an inclined columnar negative electrode active material on the surfaces of a current collector is proposed (for example in Patent Document 2). According to these proposals, the strong metallic bond between the negative electrode active material and the current collector can ensure stable current collection. Particularly for the latter proposal, spaces necessary and sufficient to accommodate the expansion are provided around the columnar active material. This structure prevents breakage of the negative electrode caused by expansion and shrinkage of the negative electrode active material and reduces the pressure and stress on the separator in contact therewith and positive electrode. Thus, the charge/discharge characteristics can particularly be improved.

However, when a silicon oxide ($SiO_x$ ($0<x<2$)) having excellent charge/discharge cycle characteristics is used for the negative electrode active material, the irreversible capacity of the silicon oxide is extremely large. For this reason, when the silicon oxide is simply combined with the positive electrode, a large portion of the reversible capacity of the positive electrode is wasted as irreversible capacity. Thus, compensation of lithium is necessary for achieving a large-capacity battery using a silicon oxide as a negative electrode active material thereof.

For this purpose, a large number of means for imparting metallic lithium to the negative electrode so that lithium is stored therein by a solid phase reaction are proposed, as the lithium compensation means. For example, a method including a step of evaporating lithium onto the surface of the negative electrode and a step of storing the electrode is proposed (for example in Patent Document 3).

However, when a negative electrode active material is formed by the methods disclosed in Patent Document 1 or 2, and lithium is evaporated onto the negative electrode surface as disclosed in Patent Document 3, lithium is not promptly absorbed in the negative electrode active material, and is non-uniformly deposited on the negative electrode surface. Such deposited lithium adheres to carrier rollers or the other side of the negative electrode, when the negative electrode is fed. This is because lithium is not diffused or stored in the negative electrode active material by a solid phase reaction and is in a state that it floats on the negative electrode surface. This adherence decreases productivity. Further, non-uniform storage of lithium in the negative electrode active material causes uneven expansion of the negative electrode active material resulting from charging, thus producing asperities on the negative electrode. This phenomenon causes non-uniform charge/discharge reaction and results in decreases in cycle characteristics, for example.

Patent Document 1: Japanese Patent Unexamined Publication No. 2002-83594
Patent Document 2: Japanese Patent Unexamined Publication No. 2005-196970
Patent Document 3: Japanese Patent Unexamined Publication No. 2005-38720

SUMMARY OF THE INVENTION

The present invention is directed to address these problems and provide a method of manufacturing a nonaqueous electrolyte secondary battery at excellent productivity. The method of manufacturing a negative electrode for a nonaqueous electrolyte secondary battery includes the following three steps of:

A) fabricating the negative electrode by depositing a negative electrode active material on a current collector;
B) heat-treating the negative electrode; and
C) imparting lithium to the negative electrode active material after the B step.

The negative electrode thus fabricated is capable of storing and releasing lithium ions. By combining the negative electrode with a positive electrode capable of storing and releasing lithium ions and disposing a nonaqueous electrolyte between the negative electrode and the positive electrode, a nonaqueous electrolyte secondary battery can be manufactured.

The present invention considerably increases acceptance of lithium into the negative electrode active material when lithium is imparted to the negative electrode active material. Thus, the non-uniform deposition and uneven distribution of lithium on the surface can be prevented. Further, the present invention addresses problems, such as adhesion of deposited lithium to carrier rollers or the other side of the negative electrode while the negative electrode is fed. Thus, a large-capacity nonaqueous electrolyte secondary battery of which irreversible capacity is compensated can be manufactured at excellent productivity.

DETAILED DESCRIPTION OF PREFERRED EMBODIMENT

Hereinafter, a description is provided of an exemplary embodiment of the present invention with reference to the accompanying drawings. The present invention is not limited to the following description, as long as the invention is based on the basic features described in this specification.

Figure 1:
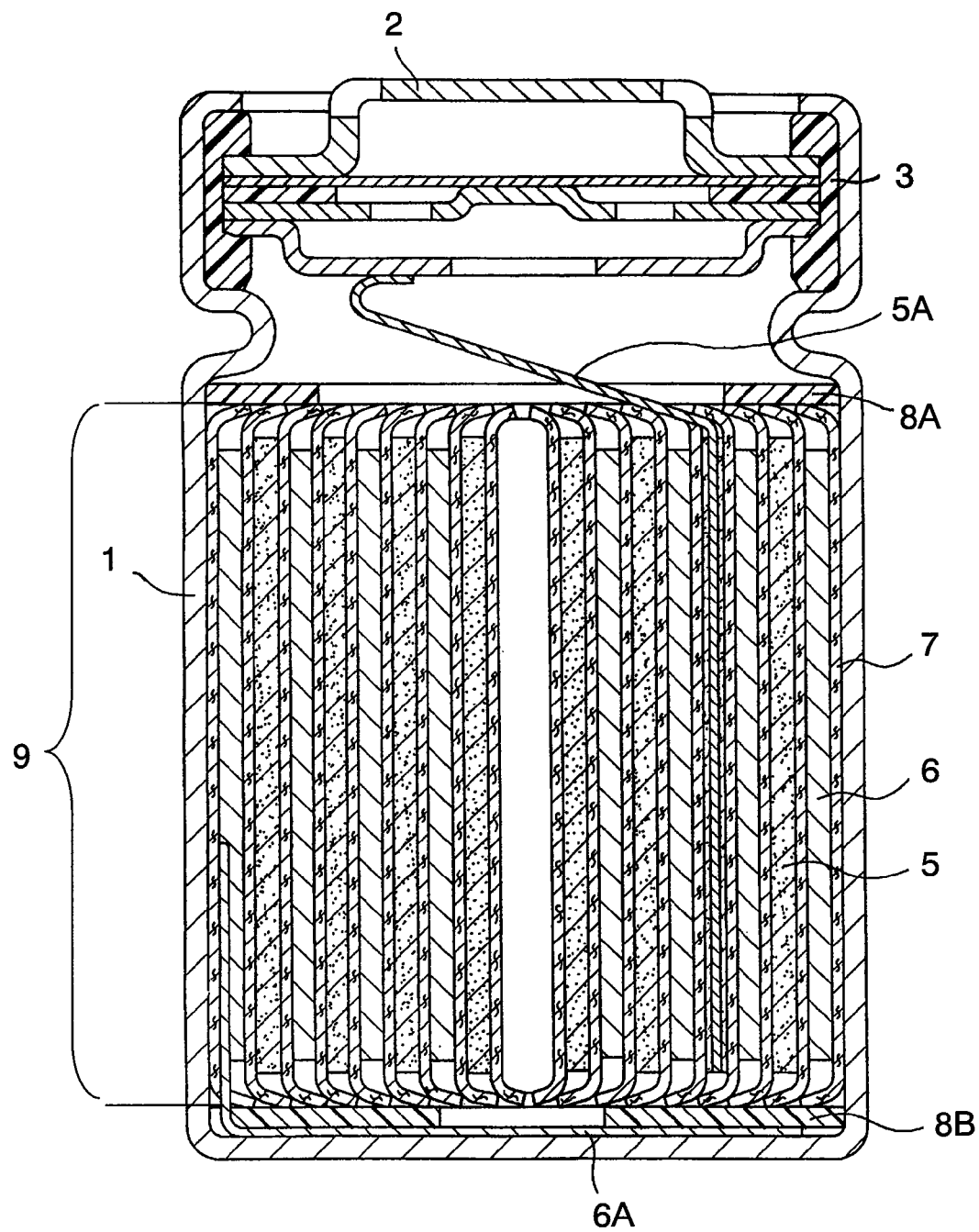
FIG. 1 is a vertical sectional view of a cylindrical nonaqueous electrolyte secondary battery in accordance with an exemplary embodiment of the present invention.

FIG. 1 is a vertical sectional view of a nonaqueous electrolyte secondary battery in accordance with the exemplary embodiment of the present invention. In this specification, a cylindrical battery is described as an example. This nonaqueous electrolyte secondary battery includes metallic case 1, and electrode body 9 housed in case 1. Case 1 is made of a stainless steel or nickel-plated iron. Positive electrode 5 and negative electrode 6 are spirally wound together with separator 7 disposed therebetween, to form electrode body 9. Upper insulating plate 8A is disposed on electrode body 9. Lower insulating plate 8B is disposed under electrode body 9. To close the opening end of case 1, case 1 is crimped onto sealing plate 2 via gasket 3.

One end of positive electrode lead 5A made of aluminum is attached to positive electrode 5. The other end of positive electrode lead 5A is connected to sealing plate 2 that also works as a positive electrode terminal. One end of negative electrode lead 6A made of nickel is attached to negative electrode 6. The other end of negative electrode lead 6A is connected to case 1 that also works as a negative electrode terminal. Electrode body 9 is impregnated with a nonaqueous electrolyte not shown. In other words, the nonaqueous electrolyte is disposed between positive electrode 5 and negative electrode 6.

Positive electrode 5 is generally composed of a positive electrode current collector and a positive electrode mixture supported by the current collector. The positive electrode mixture may contain a binder, conductive agent, and the like, in addition to a positive electrode active material. For example, positive electrode 5 is fabricated in the following procedure. A positive electrode mixture made up of a positive electrode active material and any other component is mixed with liquid components, so that positive electrode mixture slurry is prepared. Then, the obtained slurry is applied to a positive electrode current collector, and dried.

As the positive electrode active material for a nonaqueous electrolyte secondary battery, a lithium-containing complex metal oxide can be used. Such oxides include $Li_xCoO_2$, $Li_xNiO_2$, $Li_xMnO_2$, $Li_xCo_yM_{1-y}O_z$, $Li_xNi_{1-y}O_z$, $Li_xMn_2O_4$, $Li_xMn_{2-y}M_yO_4$, $LiMPO_4$, and $Li_2MPO_4F$ where M is at least one of Na, Mg, Sc, Y, Mn, Fe, Co, Ni, Cu, Zn, Al, Cr, Pb, Sb, and B, $0 \leq x \leq 1.2$, $0 \leq y \leq 0.9$, and $2.0 \leq z \leq 2.3$. The x value showing a molar ratio of lithium is a value immediately after the fabrication of the active material and changed by charging and discharging. Further, a part of each of these lithium-containing compounds may be substituted with different elements. Surface treatment may be provided using a metal oxide, lithium oxide, or conductive agent. Hydrophobic treatment may be provided on the surface thereof.

The materials usable for the binder of the positive electrode mixture include: polyvinylidene-fluoride (PVDF), polytetrafluoroethylene, polyethylene, polypropylene, aramid resin, polyamide, polyimide, polyamide-imide, polyacrylonitrile, polyacrylic acid, polymethylacrylate, polyethylacrylate, polyhexylacrylate, poly methacrylic acid, polymethyl methacrylate, polyethyl methacrylate, polyhexyl methacrylate, polyvinyl acetate, polyvinyl pyrrolidone, polyether, polyethersulfone, hexafluoropolypropylene, styrene-butadiene rubber, and carboxymethylcellulose. Other materials usable for the binder include copolymers containing at least two kinds selected from tetrafluoroethylene, hexafluoroethylene, hexafluoropropylene, perfluoro alkyl vinyl ether, vinylidene fluoride, chlorotrifluoroethylene, ethylene, propylene, pentafluoropropylene, fluoromethyl vinyl ether, acrylic acid, and hexadiene. At least two kinds selected from these materials may be mixed to be used.

The materials of the conductive agent include: graphites such as natural graphite and artificial graphite; carbon blacks, such as acetylene black, Ketjen black, channel black, furnace black, lamp black, and thermal black; conductive fibers such as carbon fiber and metal fiber; metal powder made of aluminum or the like; conductive whiskers such as zinc oxide whisker and potassium titanate whisker; conductive metal oxides such as a titanium oxide; and organic conductive materials such as phenylene derivatives.

Preferably, the composition ratio of the positive electrode active material is in the range of 80 to 97 wt %, that of the conductive agent is in the range of 1 to 20%, and that of the binder is in the range of 2 to 7%.

For the positive electrode current collector, a long conductive plate having a porous or non-porous structure is used. For the positive electrode current collector, a conductive plate made of stainless steel, aluminum, titanium, or the like is used. For the negative electrode current collector, a conductive plate made of stainless steel, nickel, copper, or the like is used. The thickness of these current collectors is not specifically limited. However, a thickness in the range of 1 to 500 μm is preferable, and a thickness in the range of 5 to 20 μm is more preferable. Setting the thickness of the current collectors within the above range can reduce the weight of the electrodes while keeping the strength thereof.

The materials to be used for separator 7 include a microporous thin film, woven material, nonwoven fabric, and the like that have a large ion permeability, a predetermined mechanical strength, and electrically insulating properties. For the material of separator 7, polyolefin such as polypropylene and polyethylene is preferable from the viewpoint of the safety of a nonaqueous electrolyte secondary battery because polyolefin has excellent durability and a shutdown function. The thickness of separator 7 is generally in the range of 10 to 300 μm. It is preferable that the thickness is set equal to or smaller than 40 μm. More preferably, the thickness is in the range of 5 to 30 μm. Still more preferably, the thickness is in the range of 10 to 25 μm. Further, the microporous film may be a single-layer film made of a single material, or a composite film or multilayer film made up of at least two kinds of materials. Preferably, the porosity of separator 7 is in the range of 30 to 70%. The porosity means an area ratio of voids occupying in the surface area of separator 7. The more preferable range of the porosity of separator 7 is from 35 to 60% inclusive.

For the nonaqueous electrolyte, materials in the form of liquid, gel, or solid (polymeric solid electrolyte) can be used. The liquid nonaqueous electrolyte (nonaqueous electrolyte solution) can be prepared by dissolving an electrolyte (e.g. a lithium salt) in a nonaqueous solvent. The gel nonaqueous electrolyte contains a liquid nonaqueous electrolyte and a polymeric material holding this liquid nonaqueous electrolyte therein. The preferable polymeric materials include: PVDF, polyacrylonitrile, polyethylene oxide, polyvinyl chloride, polyacrylate, and polyvinylidenefluoride hexafluoropolypropylene.

As the nonaqueous solvent, well-known nonaqueous solvents can be used. The kinds of the nonaqueous solvent are not specifically limited. The usable materials of the nonaqueous solvent include: cyclic carbonates, chain carbonates, and cyclic carboxylates. The cyclic carbonates include propylene carbonate (PC) and ethylene carbonate (EC). The chain carbonates include diethyl carbonate (DEC), ethyl methyl carbonate (EMC), and dimethyl carbonate (DMC). The cyclic carboxylates include γ-butyrolactone (GBL) and γ-valerolactone (GVL). The non-aqueous solvent may be used singly or may be in a combination of two or more thereof.

The usable materials of solute to be dissolved in the non-aqueous solvent include: $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lower aliphatic lithium carboxylate, LiCl, LiBr, LiI, chloroborane lithium, various borates, and various imides. The borates include: lithium bis(1,2-benzenediolate (2-)-O,O') borate, lithium bis(2,3-naphthalenediolate (2-)-O,O') borate, lithium bis(2,2'-biphenyldiolate (2-)-O,O') borate, and lithium bis (5-fluoro-2-olate-1-benzenesulfonic acid-O,O') borate. The imides include: lithium bis-trifluoromethane sulfonyl imide $((CF_3SO_2)_2NLi)$, lithium trifluoromethanesulfonyl nonafluorobutanesulfonyl imide $(LiN(CF_3SO_2)(C_4F_9SO_2))$, and lithium bis-pentafluoroethane sulfonyl imide $((C_2F_5SO_2)_2NLi)$. The solute may be used singly or may be used in a combination of two or more thereof.

Furthermore, the non-aqueous electrolyte may include a material as an additive, which is decomposed on negative electrode 6 and is capable of forming a coating film having high conductivity of lithium ions and increasing the charge and discharge efficiency. An example of the additive having such a function may include vinylene carbonate, 3-methyl vinylene carbonate, 3,4-dimethyl vinylene carbonate, 3-ethyl vinylene carbonate, 3,4-diethyl vinylene carbonate, 3-propyl vinylene carbonate, 3,4-dipropyl vinylene carbonate, 3-phenyl vinylene carbonate, 3,4-diphenyl vinylene carbonate, vinyl ethylene carbonate, and divinyl ethylene carbonate. These may be used singly or in a combination of two or more thereof. Among these, at least one kind selected from a group consisting of vinylene carbonate, vinyl ethylene carbonate, and divinyl ethylene carbonate is preferable. In each of the above compounds, a part of the hydrogen atoms may be substituted with fluorine atoms. Preferably, the amount of the additive dissolved in the nonaqueous solvent is in the range of 0.5 to 2 mol/L.

Furthermore, the non-aqueous electrolyte may contain a well-known benzene derivative that is decomposed at the time of overcharging and forms a coating film on positive electrode 5 so as to inactivate a battery. As such a benzene derivative, one having a phenyl group and a cyclic compound group neighboring to this phenyl group is preferred. As the cyclic compound group, a phenyl group, a cyclic ether group, a cyclic ester group, a cycloalkyl group, a phenoxy group, and the like, are preferred. A specific example of the benzene derivative may include cyclohexylbenzene, biphenyl, diphenyl ether, and the like. These may be used singly or may be in a combination of two or more thereof. However, it is preferable that the content of the benzene derivative is 10 vol % or less with respect to the entire non-aqueous solvent.

Next, a description is provided of the structure of negative electrode 6. The negative electrode active material is made of a material capable of storing and releasing lithium ions. In particular, preferably, the negative electrode active material has a volume in a charged state larger than the volume in a discharged state, and a theoretical capacity density larger than that of carbon material. For such a negative electrode active material, ratio A/B, i.e. the ratio of volume A in the charged state with respect to volume B in the discharged state, is equal to or larger than 1.2. The theoretical capacity density thereof is equal to or larger than 833 mAh/cm$^3$. The examples of such active material are materials capable of storing and releasing a large amount of lithium ions at a lower potential than the positive electrode active material. The examples of such a material include silicon (Si) and tin (Sn). Such a material can offer the advantages of the present invention, even when the material is any one of an elemental substance, alloy, compound, solid solution, and complex active material containing silicon material or tin material. In particular, silicon-containing material has a large capacity density and a low cost, and thus is preferable. The examples of the silicon-containing material include Si and $SiO_x$ (0<x<2), and alloys, compounds, and solid solution of one of the above substances in which a part of Si is substituted with at least one element selected from a group consisting of B, Mg, Ni, Ti, Mo, Co, Ca, Cr, Cu, Fe, Mn, Nb, Ta, V, W, Zn, C, N, and Sn. Other than these, tin-containing material, such as $Ni_2Sn_4$, $Mg_2Sn$, SnOx (0<x<2), $SnO_2$, $SnSiO_3$, and LiSnO, can be used.

The negative electrode active material may be made of only one of the above materials or made up of a plurality of kinds of the materials in combination. The examples of making up the negative electrode active material using the plurality of kinds of the materials include: a compound containing Si, oxygen, and nitrogen; and a complex of a plurality of compounds that contain Si and oxygen and have different constituent ratios of Si and oxygen. Among these materials, $SiO_x$ ($0 \leqq x \leqq 2$) is preferable as the negative electrode active material, because this oxide has a large discharge capacity density, and has an expansion coefficient at charging smaller than that of Si elemental substance. Among the above constitution ratios, a ratio of $0.1 \leqq x \leqq 1.8$ is preferable and a ratio of $0.3 \leqq x \leqq 1.0$ is more preferable, because such a ratio can provide the excellent balance between the capacity and expansion coefficient thereof.

Next, a description is provided of an example of negative electrode 6 and a manufacturing method thereof, using $SiO_x$ ($0<x<2$) as an example of the negative electrode active material. First, an electrolytic copper foil to be a negative electrode current collector is attached and fixed to a water-cooled roller placed in a vacuum evaporation device (not shown). Directly below the water-cooled roller, a graphite crucible containing high-purity Si therein is placed. After the inside of the vacuum evaporation device is depressurized, Si in the graphite crucible is heated with electron beams, so that Si is vacuum-evaporated (deposited) onto the current collector. At this time, a trace amount of oxygen is introduced from oxygen nozzles into the vacuum evaporation device during evaporation. After evaporation onto one side of the current collector is completed, similar vacuum evaporation is further performed onto the other side (unevaporated side), so that a thin film of the negative electrode active material made of a silicon oxide ($SiO_x$ ($0<x<2$)) is formed on each side. Thus, negative electrode 6 in a belt-like shape is fabricated.

Figure 2:
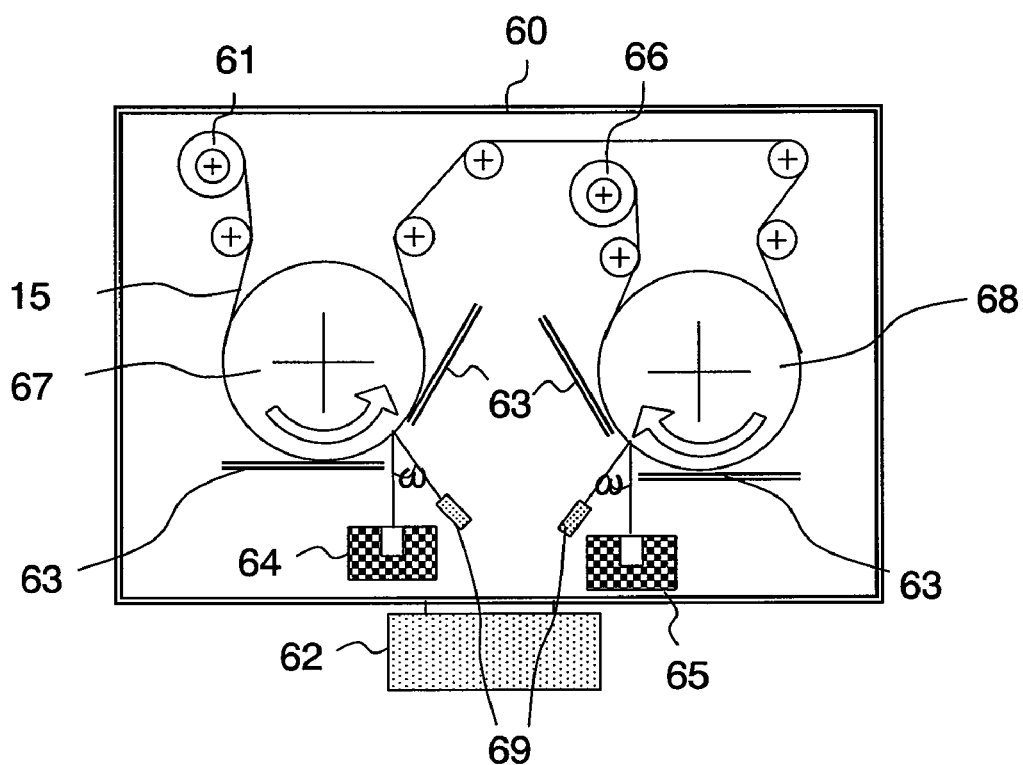
FIG. 2 is schematic view of a structure of a device to be used to manufacture a negative electrode active material having an inclined columnar structure in accordance with the exemplary embodiment of the present invention.
Figure 3:
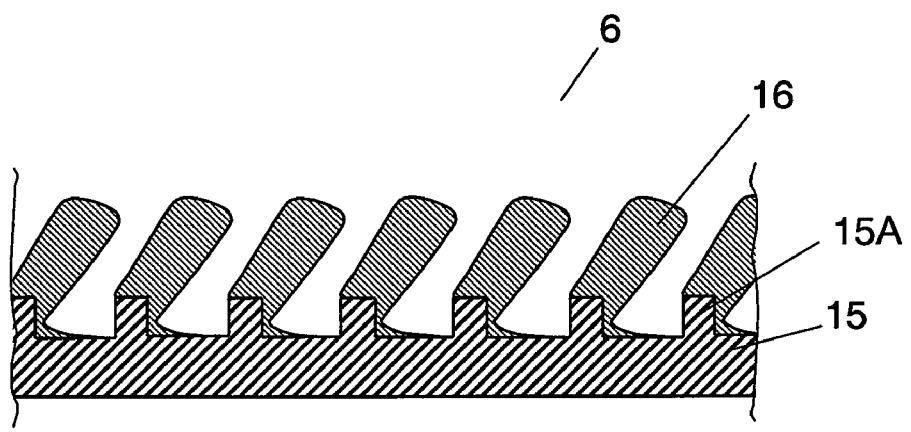
FIG. 3 is a schematic sectional view of the negative electrode that includes the negative electrode active material having the inclined columnar structure in accordance with the exemplary embodiment of the present invention.

Now, with reference to FIGS. 2 and 3, a description is provided of a method of forming the negative electrode active material in a more preferable configuration. FIG. 2 schematically shows a structure of a device to be used to fabricate a negative electrode active material having an inclined columnar structure. FIG. 3 is a schematic sectional view of a negative electrode fabricated using the device shown in FIG. 2.

In the device of FIG. 2, current collector 15 is fed from feeding roll 61 to winding-up roll 66 via film-forming rolls 67 and 68. These rolls and evaporation units 64 and 65 are provided in vacuum chamber 60. The inside of vacuum chamber 60 is depressurized by vacuum pump 62. In each of evaporation units 64 and 65, an evaporation source, a crucible, and an electron beam generator are unitized.

As shown in FIG. 3, current collector 15 has a large number of projections 15A on the surfaces thereof. For example, a 30-µm-thick electrolytic copper foil on which asperities having an average surface roughness of 2.0 µm are formed by electrolytic plating is used as current collector 15. Projections 15A are provided on both sides of current collector 15. However, FIG. 3 only shows the projections on one side.

The inside of vacuum chamber 60 is set to have a low-pressure atmosphere of an inert gas, e.g. an argon atmosphere at a pressure of 3.5 Pa. During evaporation, an electron beam generated by the electron beam generator is polarized by a polarizing yoke, so that the evaporation source is irradiated with the polarized beam. For example, Si is used for this evaporation source. The shape of the openings of masks 63 is adjusted to prevent the Si vapor generated in evaporation units 64 and 65 from entering perpendicularly to the surface of current collector 15.

In this manner, while the Si vapor is supplied to the surface of current collector 15, current collector 15 is fed from feeding roll 61 to winding-up roll 66. Thus, the Si vapor deposits over projections 15A as anchor points, to form active material blocks 16. Oxygen nozzle 69 is provided to make angle ω with respect to the incident direction of the Si vapor, and oxygen is introduced from oxygen nozzle 69 into vacuum chamber 60 at this time. With the introduction of oxygen, active material blocks 16 made of a silicon oxide are produced. For example, angle ω is set at 65°, oxygen gas having a purity of 99.7% is introduced from oxygen nozzles 69 into vacuum chamber 60, and the film-forming speed is set at approximately 20 nm/sec. In this case, 21-µm-thick columnar active material blocks 16 made of $SiO_{0.4}$ are produced over projections 15A on current collector 15. After active material blocks 16 are formed on one side using film-forming roll 67, current collector 15 is fed to film-forming roll 68, where active material blocks 16 can also be formed on the other side in a similar manner. Thus, negative electrode 6 is fabricated as a first step.

Meanwhile, heat-resistant tapes are equidistantly attached to both sides of current collector 15 in advance. Peeling off the tapes after film forming can provide exposed portions of the current collector to be welded to negative electrode lead 6A.

In this exemplary embodiment, it is preferable that active material blocks 16 securely adhere to the surfaces of current collector 15 of negative electrode 6. In particular, preferably, negative electrode 6 is fabricated by a vacuum film forming method represented by vacuum evaporation, sputtering, chemical vapor deposition (CVD), or the like.

Materials usable for current collector 15, lead 11, and terminal 13 include a metal foil made of stainless steel, nickel, copper, titanium, or the like, and a thin film made of carbon or conductive resin. Further, surface treatment may be provided thereon using carbon, nickel, titanium, or the like.

Figure 4:
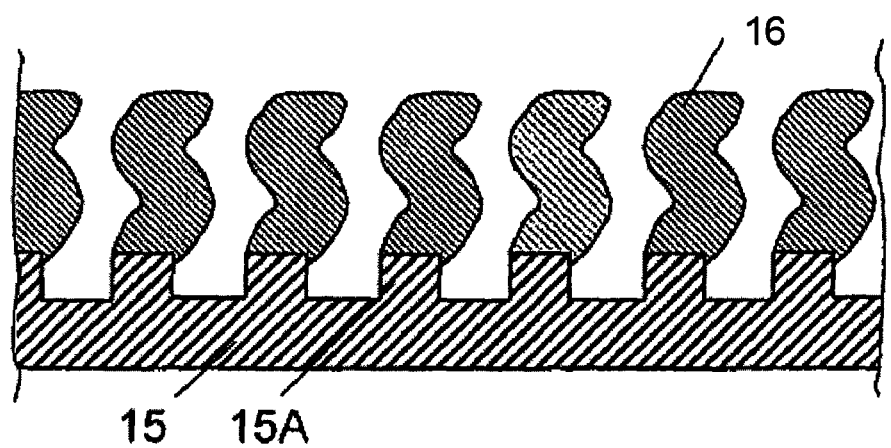
FIG. 4 is a schematic sectional view of the negative electrode that includes the negative active material blocks having the wave shape structure in accordance with the exemplary embodiment of the present invention.

Negative electrode 6 including current collector 15 and a plurality of columnar active material blocks 16 formed thereon may be fabricated by the method disclosed in Japanese Patent Unexamined Publication No. 2003-17040 or 2002-279974, in addition to the above method. However, it is preferable that active material blocks 16 are formed to be inclined with respect to the surfaces of current collector 15. Alternatively, as shown in FIG. 4, it is preferable to form active material blocks 16 in a wave shape in the direction perpendicular to the surfaces of current collector 15 on which active material blocks 16 are to be formed.

Inclining active material blocks 16 with respect to the surfaces of current collector 15 or forming active material blocks 16 in a wave shape in this manner improves the charge/discharge characteristics of the negative electrode. One of the reasons therefor is considered as follows, though not definite. A chemical element having a property of storing lithium ions expands and shrinks at storing and releasing lithium ions, respectively. The stress created by this expansion and shrinkage is distributed in the direction parallel to and in the direction perpendicular to the surfaces of current collector 15 on which active material blocks 16 are formed. This distribution inhibits generation of winkles in current collector 15 and peeling of active material blocks 16. Thus, the charge/discharge cycle characteristics are improved in comparison with a smooth film structure. In the method of inclining active material blocks 16 with respect to the surfaces of current collector 15, the film can be formed at a high speed. Thus, this method is preferable from the viewpoint of mass production.

Negative electrode 6 fabricated by either one of the above methods is placed in an atmosphere furnace (not shown) and heat-treated under predetermined temperature conditions. At this time, it is preferable that the negative electrode is heat-treated in a non-oxidizing atmosphere. This atmosphere can prevent excessive oxidation of the negative electrode active material and thus prevent the irreversible capacity from increasing. For a negative electrode active material of $SiO_x$, it is preferable to set the heat treatment temperature in the range of 100 to 900° C. inclusive. Preferably, heat treatment is performed at a temperature equal to or higher than 100° C. to diffuse an oxygen-rich layer into the inside of negative electrode active material. The oxygen-rich layer is formed on the surface of the negative electrode active material and inhibits lithium from being stored therein. Preferably, heat treatment is performed at a temperature equal to or lower than 900° C. at which silicon oxide as the negative electrode active material does not separate into two phases, namely crystalline element silicon and silicon dioxide. When other materials are used for the negative electrode active material, heat treatment at a temperature within an optimum temperature range thereof can offer the similar advantages.

Note here that the heat treatment of negative electrode 6 and formation of negative electrode active material blocks 16 need not be performed separately. For example, a heating path may be added to the inside of a vacuum evaporation device for forming active material blocks 16 so that the heat treatment is performed by heating the negative electrode during feeding right after film forming. Under some evaporation conditions, the temperature of active material blocks 16 may rise into the above temperature range. In this case, formation and heat treatment of the negative electrode active material proceed at the same time. By performing the A and B steps in the same chamber in this manner, two steps can be performed in one device. Thus, the efficiency in manufacturing a negative electrode for a nonaqueous electrolyte secondary battery can be increased.

Next, negative electrode 6 subjected to heat treatment is placed in a vacuum evaporation device, and a copper crucible incorporated with a rod heater is placed therein. Metallic lithium is placed in the crucible. After the inside of the vacuum evaporation device is depressurized, the metallic lithium is melted by high-frequency melting so that lithium is evaporated onto the surface of negative electrode 6. After evaporation onto one side of negative electrode 6 is completed, similar vacuum evaporation is further performed onto the other side, so that lithium is evaporated onto both sides of negative electrode 6.

Alternatively, lithium may be imparted to the negative electrode active material of negative electrode 6 in the following manner. First, lithium is vacuum-evaporated onto an electrolytic copper foil using a vacuum evaporation device in a manner similar to the above one. The lithium thin film on the electrolytic copper foil thus formed is faced and pressed for joining to the surface of negative electrode 6. The pressing stress is set at 1 $kg/cm^2$, for example. The pressing is performed in an argon atmosphere. Thus, lithium is transferred onto negative electrode 6.

The heat treatment of negative electrode 6 and impartment of lithium need not be performed separately. For example, a heating path may be provided in the vacuum evaporation device to perform heat treatment immediately before the above lithium evaporation. Alternatively, while negative electrode 6 is heated, lithium may be evaporated thereon. By performing the B and C steps in the same chamber in this manner, two steps can be performed in one device. Thus, the efficiency in manufacturing a negative electrode for a nonaqueous electrolyte secondary battery can be increased.

In this exemplary embodiment, heat treatment is performed before lithium is imparted to the surfaces of negative electrode 6 to compensate for irreversible capacity as described above. This heat treatment can prevent the non-uniform deposition and uneven distribution of lithium on the surfaces of negative electrode 6, and thus adhesion of lithium to unnecessary portions. The reasons therefor are considered as follows.

In preparation of negative electrode 6, Si is evaporated onto current collector 15 in a vacuum film-forming device by a film forming method such as evaporation and sputtering, as the A step. Further, a silicon oxide is formed on current collector 15 as a thin film by introducing a trace amount of oxygen into the device. However, in this method, an oxygen-rich silicon oxide layer is inevitably produced in the outermost surface portions of the negative electrode active material. This is because oxygen diffused into the device exists in the places other than the film-forming areas, and comes to the outermost surface and oxidize them.

The outermost surface layer is less likely to react with lithium than the inner layer. Thus, lithium evaporated onto the surfaces is difficult to diffuse into the inner layer of the negative electrode active material. As a result, the negative electrode is fed with lithium deposited on the surface thereof in the C step of imparting lithium to negative electrode 6. When the negative electrode is fed on carrier rollers or wound into a hoop shape, lithium adheres to the other side of the negative electrode and makes reaction. This phenomenon can cause a failure to compensate for necessary irreversible capacity. Because lithium adhering to the rollers has adherence, in the worst case, the lithium can make contact with another piece of negative electrode 6 to cause breakage or rupture during feeding and considerably decrease mass productivity.

To address this problem, heat-treating negative electrode 6 as the B step between the A step and C step allows diffusion of oxygen in the oxygen-rich outermost surface layers into the inside. As a result, the negative electrode active material of negative electrode 6 changes to have a surface structure likely to accept lithium. Thus, non-uniform deposition and uneven distribution of lithium can be prevented. Further, providing the B step can considerably reduce problems such as deposition of lithium on the surfaces, and transfer of lithium onto the carrier rollers or the other side of negative electrode 6. Thus, a large-capacity nonaqueous electrolyte secondary battery of which irreversible capacity is compensated can be produced at excellent productivity.

The B step is a way effective in the negative electrode active material of any structure formed in the A step. The B step is particularly effective when the negative electrode active material having a columnar structure is formed on current collector 15, and is extremely effective when the columnar structure is inclined with respect to the thickness direction of current collector 15. The columnar structure is effective against expansion and shrinkage of the negative electrode active material. However, the columnar structure has a larger surface area than a smooth film structure, and thus is more likely to have an oxygen-rich outermost layer around active substance blocks 16. Further, when the columnar structure is inclined with respect to the thickness direction of current collector 15, active material blocks 16 have a thicker oxygen-rich layer on the surface opposite to the surface near current collector 15. This is because the opposite surface is more easily influenced by oxygen distribution in the A step.

Performing the B step on these structures allows diffusion of oxygen from the oxygen-rich layers into the active material for homogenization thereof. Thus, the acceptance of lithium can be improved.

Further, not only such an oxygen-rich layer is unlikely to accept lithium, but a part of the layer irreversibly reacts with lithium to produce an electrochemically inert compound. A typical example thereof is an inorganic lithium compound such as a lithium oxide. Providing the B step can reduce the oxygen-rich layers in advance, thus improving acceptance of lithium. Further, preventing production of an electrochemically irreversible and inert compound can reduce the irreversible capacity and inhibit the production of an unnecessary coating. As a result, the charge/discharge cycle characteristics are remarkably improved.

Preferably, active material block 16 having a columnar structure and inclined with respect to the thickness direction of the current collector has different oxygen contents between the surface near current collector 15 and the surface opposite thereto. Such a structure can further alleviate the stress in expansion and shrinkage caused by charging and discharging, thus further improving the cycle characteristics.

Preferably, the B step is performed in a non-oxidizing atmosphere. Such an atmosphere can prevent excessive oxidation of the negative electrode active material and an increase in irreversible capacity. The preferable non-oxidizing atmospheres include atmospheres of a vacuum and inert gases, e.g. nitrogen and argon.

Preferably, in the B step, heat treatment is performed in the temperature range of 100 to 900° C. inclusive. In a temperature range lower than 100° C., the oxygen-rich layer is not sufficiently diffused. In a temperature range higher than 900° C., diffusion of the oxygen-rich layer proceeds, but the phase separation is likely to occur in the negative electrode active material. The phase separation means that the silicon oxide of the negative electrode active material separates into two phases, i.e. the crystalline element silicon, and silicon dioxide. In this state, generation of the silicon dioxide decreases the electron conductivity. Further, the crystalline element silicon has low reversibility in reaction. Thus, the battery characteristics decrease remarkably. More preferably, the heat treatment is performed in the temperature range of 300 to 600° C. inclusive.

Preferably, in the C step, lithium is melt and evaporated onto the surfaces of negative electrode 6 in a vacuum atmosphere to compensate for the irreversible capacity of the negative electrode. This method is optimum for forming a lithium film having a thickness in the range of several micrometers to several tens of micrometers on the surfaces of negative electrode 6. Further, it is preferable that an amount of lithium corresponding to the amount of compensation for the irreversible capacity of the negative electrode active material is imparted in the C step. Such control of the amount of lithium to be imparted allows the large capacity density of the negative electrode active material to be used, and prevents unnecessary lithium from remaining on the negative electrode.

Alternatively, a lithium thin film and negative electrode 6 can be faced and joined to each other in a non-oxidizing atmosphere so that lithium is transferred onto the negative electrode. This method of imparting lithium can also compensate for the irreversible capacity in a manner similar to the above.

A nonaqueous electrolyte secondary battery of the present invention features a negative electrode active material, and the other components are not specifically limited.

Hereinafter, a description is provided of specific examples of this exemplary embodiment.

(1) Fabrication of Negative Electrode

Negative electrode 6 of sample A1 is fabricated in the following procedure. First, Si (ingot having a purity of 99.999%) is placed in a graphite crucible. A 20-μm-thick electrolytic copper foil to be a current collector is attached and fixed to water-cooled rollers installed in the above-described vacuum evaporation device. A graphite crucible containing Si therein is placed directly below the water-cooled rollers, and heated with electron beams so that Si is vacuum-evaporated onto the current collector sheet. At this time, oxygen is introduced at a rate of 30 sccm from oxygen nozzles into the vacuum evaporation device during evaporation. For the evaporation conditions, the accelerating voltage is set at −8 kV, and the current is set at 30 mA. The degree of vacuum is set at $3 \times 10^{-3}$ Pa.

After evaporation onto one side of the current collector is completed, similar vacuum evaporation is further performed on the other side, so that a thin film of the negative electrode active material is formed on each side of the current collector. An X-ray diffraction analysis of this thin film showed a crystalline peak attributed to copper, i.e. the current collector, and a broad peak in a position of $15° \leqq 2\theta \leqq 40°$. This result shows that the active material film formed is amorphous. The active material thin film on each side of negative electrode 6 is approximately 15 μm thick, respectively. The oxygen content of this negative electrode active material examined by a combustion method is $SiO_{0.35}$. An observation of the section of this negative electrode shows that the negative electrode active material is uniformly formed on the current collector and an oxygen-rich layer is formed within a depth of 0.8 μm from the surface.

(2) Heat Treatment of Negative Electrode

Negative electrode 6 is placed in an atmosphere furnace incorporating a device capable of unwinding and winding a negative electrode roll, and heat-treated at a temperature of 80° C. For the conditions other than the temperature, the rate of temperature increase is set at 10° C./min, and the time period for keeping the set temperature (heat treatment time) is set for one hour. The atmosphere inside the furnace is controlled by the supply of argon at a flow rate of 1 L/min.

(3) Lithium Impartment to Negative Electrode

In the vacuum evaporation device, negative electrode 6 subjected to the B step is placed, and a copper crucible incorporated with a rod heater is also placed instead of the graphite crucible. In the copper crucible, metallic lithium is placed and melted by high-frequency melting so that lithium is evaporated onto the surface of negative electrode 6. For the preset conditions, the degree of vacuum in the device is set at $3 \times 10^{-3}$ Pa, and the heater is controlled for evaporation so that the temperature of the crucible is constant at 550° C.

After evaporation onto one side of negative electrode 6 is completed, similar vacuum evaporation is further performed on the other side, so that lithium is evaporated onto both sides of negative electrode 6. An IPC analysis of negative electrode 6 shows that lithium approximately 7 μm thick is imparted to each side of the electrode. This lithium amount corresponds to the amount of the irreversible capacity of negative electrode 6 that has been evaluated by a charge/discharge test performed on negative electrode 6 in advance using metallic lithium for the counter electrode.

Each negative electrode 6 subjected to the C step is handled and stored in a dry atmosphere having a dew point equal to or lower than −60° C.

(4) Fabrication of Positive Electrode

Ten parts by weight of acetylene black as a conductive agent, and five parts by weight of polyvinylidene fluoride resin as a binder, are mixed with 85 parts by weight of lithium cobaltate ($LiCoO_2$) powder. This mixture is dispersed in dehydrated N-methyl-2-pyrrolidone to provide a positive electrode mixture in the form of slurry. This positive electrode mixture is applied to both sides of a positive electrode current collector made of an aluminum foil, and dried. Then, this sheet is roll-pressed, and cut into a predetermined size. Thus, positive electrode 5 is fabricated.

(5) Preparation of Nonaqueous Electrolyte Solution

Vinylene carbonate in an amount of 1 wt % is added to a mixed solvent having a volume ratio of ethylene carbonate: ethyl methyl carbonate=1:3. Further, $LiPF_6$ is dissolved in the above solution in a concentration of 1.0 mol/L. Thus, a nonaqueous electrolytic solution is prepared.

(6) Production of Cylindrical Battery

Positive electrode lead 5A made of aluminum is attached to the current collector of positive electrode 5 thus fabricated. Negative electrode lead 6A made of nickel is attached to the current collector of negative electrode 6. Positive electrode 5 and negative electrode 6 are wound together with separator 7 disposed therebetween, to form electrode body 9. Upper insulating plate 8A is disposed on electrode body 9. Lower insulating plate 8B is disposed under electrode body 9. Next, negative electrode lead 6A is welded to case 1. Positive electrode lead 5A is welded to sealing plate 2 having a safety valve acting due to inner pressure. These components are housed in case 1. Thereafter, the nonaqueous electrolyte solution is poured in case 1 by a pressure reducing method. Finally, the opening end of case 1 is crimped onto sealing plate 2 via gasket 3, so that the battery is completed. The cylindrical battery thus obtained has a battery capacity of 2,000 mAh.

Samples A2 through A9 are produced in the same manner as sample A1 except for the heat treatment temperature of negative electrode 6. The heat treatment temperature in each of samples A2 through A9 is changed in the range of 100 to 1,000° C.

For comparison, a battery of sample X including negative electrode 6 subjected to no heat treatment process is produced in the same manner as sample A1.

(7) Evaluation of Electrode after Lithium Impartment

After the procedure for imparting lithium is completed, negative electrode 6 of each sample is taken out in a dry air, and the appearance is evaluated by visual inspection. Table 1 shows the results thereof.

TABLE 1

| Sample | Heat treatment temperature (° C.) | State of negative electrode surface |
|---|---|---|
| A1 | 80 | Lithium deposited on ⅕ of entire surface |
| A2 | 100 | Lithium deposited on ¹⁄₂₀ of entire surface |
| A3 | 300 | No lithium deposited |
| A4 | 400 | No lithium deposited |
| A5 | 500 | No lithium deposited |
| A6 | 600 | No lithium deposited |
| A7 | 800 | No lithium deposited |
| A8 | 900 | No lithium deposited |
| A9 | 1,000 | No lithium deposited |
| X | — | Lithium deposited on entire surface |

Heat treatment atmosphere: argon

As a result, for each of negative electrode 6 of sample X subjected to no heat treatment and negative electrode 6 of sample A1 heat-treated at a temperature lower than 100° C., a large amount of lithium is deposited on the surfaces of negative electrodes 6. The deposited lithium adheres to the rolls or the like and makes contact with the surface of another roll of negative electrode 6 during feeding in the device, thus causing a large number of ruptures in the electrode. For sample A2 heat-treated at 100° C., lithium deposition is observed on a part of the surfaces. However, the deposited lithium does not adhere to the rolls during feeding of the negative electrode in the vacuum evaporation device, thus causing no problem in the assembly of the above cylindrical battery.

(8) Evaluation of Battery

The initial discharge capacity and cycle retention ratio are evaluated for the respective batteries of samples A1 through A9 and sample X obtained as above.

In the first charge/discharge, the batteries are charged at a constant current of 700 mA to an end voltage of 4.1V, and discharged at a current of 700 mA to an end voltage of 2.5V. Next, after charged at a constant current of 1,400 mA to an end voltage of 4.2V, the batteries are further charged at a constant voltage of 4.2V until the current decreased to 100 mA. Then, the batteries are discharged at a constant current of 2,000 mA to an end voltage of 2.0V. The discharge capacity at this time is determined to be the initial discharge capacity. Further, the capacity retention ratio after 300 cycles under the above charge/discharge conditions is calculated on the basis of the initial discharge capacity set at 100%, to provide a cycle retention ratio. Table 2 shows the obtained results.

TABLE 2

| Sample | Heat treatment temperature (° C.) | Initial discharge capacity (mAh) | Cycle retention ratio (%) |
|---|---|---|---|
| A1 | 80 | 1,600 | 62 |
| A2 | 100 | 1,950 | 79 |
| A3 | 300 | 2,000 | 84 |
| A4 | 400 | 2,000 | 85 |
| A5 | 500 | 2,000 | 85 |
| A6 | 600 | 2,000 | 83 |
| A7 | 800 | 2,000 | 75 |
| A8 | 900 | 2,000 | 71 |
| A9 | 1,000 | 1,700 | 55 |
| X | — | — | — |

As shown in Table 2, for sample X, lithium deposited on the entire surface of negative electrode 6 causes ruptures in the electrode as described above and makes even the assembly of the battery impossible. In contrast, for each of the batteries of samples A1 through A9, the discharge capacity can be measured.

However, for each of samples A1 and A9, the discharge capacity is far from a design discharge capacity of 2,000 mAh. For sample A2, the discharge capacity is close to but does not reach 2,000 mAh. The reason therefor is considered as follows. For each of samples A1 and A2, all the lithium imparted to negative electrode 6 is not used to compensate for the irreversible capacity because a part of the lithium is lost by peeling or the like. For each of samples A3 through A8, a design discharge capacity of 2,000 mAh is achieved. It is considered that all the lithium is used to compensate for the irreversible capacity.

As for the cycle retention ratio of each battery, the experimental results shows that samples A1 and A9 have lower retention ratios than samples A2 through A8. After each of theses batteries are disassembled, the surface of negative electrode 6 is observed. The observation shows that lithium is deposited on a wide range of the surfaces of negative electrode 6 of sample A1 and hindered the charge/discharge reaction with positive electrode 5. This portion corresponds to the portion where the imparted lithium is deposited. This observation shows that lithium deposited on the surfaces of negative electrode 6 does not melt or diffuse and has an adverse effect even after the battery is assembled. In contrast, no deposition is observed in sample A9. However, an SEM observation shows that the surface of negative electrode 6 is non-uniformly expanded, and a part of the negative electrode active material is peeled off from the current collector. An X-ray spectroscopic analysis of the negative electrode active material of sample A9 shows the existence of crystalline silicon and an amorphous compound. According to the above analysis, it is assumed that heat treatment at a high temperature has caused phase separation between silicon and silicon oxide in sample A9. It is considered that the phase separation has caused lithium to be stored non-uniformly, the excessively expanded active material is peeled off, and thus the initial discharge capacity is lower than those of the other batteries.

According to the above results, the heat treatment at a temperature in the range of 100 to 900° C. inclusive can provide excellent characteristics from the viewpoint of battery characteristics. In particular, batteries having a larger capacity and longer life can be provided by the heat treatment in the range of 300 to 600° C. inclusive.

Next, a description is provided of a case where active material blocks 16 are formed to be inclined with respect to the thickness direction of current collector 15 as shown in FIG. 3. For fabrication of negative electrode 6 of each of samples B1 through B9, the device of FIG. 2 and current collector 15 of FIG. 3 are used. At this time, vacuum chamber 60 is controlled to have an inner pressure of 0.2 Pa with oxygen supplied thereto at a rate of 30 sccm. For current collector 15, a 30-μm-thick copper foil surface-roughened by electrolytic deposition is used.

Thus, a negative electrode active material controlled to be expressed by $SiO_{0.35}$ is formed on current collector 15. This silicon oxide is made of active material blocks 16 having an inclined columnar structure as shown in FIG. 3. An SEM observation shows that the columns have an average diameter of 5 and a height of 18 μm. When the surface facing current collector 15 is compared with the opposite surface, an oxygen-rich layer approximately 1.2 μm thick adheres to the opposite surface. The long axis direction of these columns makes an angle of 20° with respect to the vertical line to current collector 15. The oxygen content of this negative electrode active material is measured by the combustion method. Except for the above structure, batteries of samples B1 through B9 are produced in the same manner as samples A1 through A9, respectively. In other words, for the batteries of samples B1 through B9, respective negative electrodes 6 are heat-treated at different temperatures.

For comparison, a battery of sample Y including negative electrode 6 subjected to no heat treatment process is produced in the same manner as battery B1.

After the procedure for imparting lithium is completed, negative electrode 6 of each sample is taken out in a dry air, and the appearance is evaluated by visual inspection. Table 3 shows the results thereof. Table 4 shows the results of battery characteristics evaluation.

TABLE 3

| Sample | Heat treatment temperature (° C.) | State of negative electrode surface |
|---|---|---|
| B1 | 80 | Lithium deposited on ⅓ of entire surface |
| B2 | 100 | Lithium deposited on 1/10 of entire surface |
| B3 | 300 | No lithium deposited |
| B4 | 400 | No lithium deposited |
| B5 | 500 | No lithium deposited |
| B6 | 600 | No lithium deposited |
| B7 | 800 | No lithium deposited |
| B8 | 900 | No lithium deposited |
| B9 | 1,000 | No lithium deposited |

TABLE 3-continued

| Sample | Heat treatment temperature (° C.) | State of negative electrode surface |
|---|---|---|
| Y | — | Lithium deposited on entire surface |

Heat treatment atmosphere: argon

TABLE 4

| Sample | Heat treatment temperature (° C.) | Initial discharge capacity (mAh) | Cycle retention ratio (%) |
|---|---|---|---|
| B1 | 80 | 1,500 | 65 |
| B2 | 100 | 1,900 | 84 |
| B3 | 300 | 2,000 | 91 |
| B4 | 400 | 2,000 | 93 |
| B5 | 500 | 2,000 | 94 |
| B6 | 600 | 2,000 | 93 |
| B7 | 800 | 2,000 | 86 |
| B8 | 900 | 2,000 | 80 |
| B9 | 1,000 | 1,500 | 61 |
| Y | — | — | — |

As shown Table 3, for each of samples B1 through B9 and sample Y, tendencies similar to those of samples A1 through A9 and sample X are basically observed in negative electrode 6 after lithium impartment. Further, for the battery characteristics, similar tendencies are also observed as shown in Table 4.

In comparison between samples A1 through A8 and samples B1 through B8, the latter sample batteries exhibited larger cycle retention ratios under the same treatment conditions. Each of the batteries is disassembled after the charge/discharge cycle test and the thickness of negative electrode 6 is measured. For each of samples A1 through A8, the negative electrode expanded to a thickness 1.6 times the thickness before assembly. For each of samples B1 through B8, the negative electrode expanded to a thickness 1.3 times the thickness before assembly. It is considered that this difference is due to the following reason. Because each of samples B1 through B8 has active material blocks 16 having a columnar structure, active material blocks 16 can expand into the spaces around the columns. Thus, the negative electrode does not expand excessively in the thickness direction of the active material layer. As a result, problems, such as compression of separator 7 and exudation of the nonaqueous electrolytic solution, are unlikely to occur and the cycle characteristics are excellent.

Next, a description is provided of a case where the C step of imparting lithium to negative electrode 6 is performed by a method other than evaporation. In fabrication of negative electrode 6 of each of samples C1 through C9 and sample Z, lithium is imparted to negative electrode 6 to compensate for the irreversible capacity of negative electrode 6 in the following manner.

First, a lithium film is formed on an electrolytic copper foil of 12 μm thickness, using a vacuum evaporation device. The film-forming conditions are the same as those for lithium impartment to the negative electrode of sample A1. The lithium surface of the lithium thin film on the electrolytic copper foil thus fabricated is faced to negative electrode 6 before lithium impartment that is fabricated in the same manner as samples B1 through B9 and sample Y. Then lithium on the foil and negative electrode 6 are pressed for joining in an argon atmosphere. The stress during pressing is 1 kg/cm². After the pressing, negative electrode 6 is wound in a roll shape, and stored at 85° C. in a vacuum atmosphere for 12 hours. Then, the appearance is evaluated by visual inspection. Table 5 shows the results thereof.

TABLE 5

| Sample | Heat treatment temperature (° C.) | State of negative electrode surface |
|---|---|---|
| C1 | 80 | Lithium deposited on ⅕ of entire surface |
| C2 | 100 | Lithium deposited on 1/20 of entire surface |
| C3 | 300 | No lithium deposited |
| C4 | 400 | No lithium deposited |
| C5 | 500 | No lithium deposited |
| C6 | 600 | No lithium deposited |
| C7 | 800 | No lithium deposited |
| C8 | 900 | No lithium deposited |
| C9 | 1,000 | No lithium deposited |
| Z | — | Lithium deposited on entire surface |

Heat treatment atmosphere: argon

As obvious from Table 5, tendencies similar to those shown in Tables 1 and 3 are observed even when the method of imparting lithium is changed. In other words, for negative electrode 6 of each of samples C1, C2, and Z heat-treated at a temperature equal to or lower than 100° C., lithium deposited on the surfaces of negative electrode 6 is observed even after storage. In the portions having such remaining lithium, the electrolytic copper foil is also kept adhering to negative electrode 6 and needed to be peeled off from the negative electrode.

Next, batteries are produced using these negative electrodes 6 in the same manner as sample A1. Table 6 shows the evaluation results thereof.

TABLE 6

| Sample | Heat treatment temperature (° C.) | Initial discharge capacity (mAh) | Cycle retention ratio (%) |
|---|---|---|---|
| C1 | 80 | 1,500 | 65 |
| C2 | 100 | 1,900 | 85 |
| C3 | 300 | 2,000 | 90 |
| C4 | 400 | 2,000 | 92 |
| C5 | 500 | 2,000 | 94 |
| C6 | 600 | 2,000 | 93 |
| C7 | 800 | 2,000 | 86 |
| C8 | 900 | 2,000 | 81 |
| C9 | 1,000 | 1,500 | 62 |
| Z | — | 1,200 | 55 |

As shown in Table 6, the results similar to those of samples B1 through B9 and sample Y are obtained. In other words, the results shows that both discharge capacity and cycle retention ratio are low, for each of the batteries of samples C1, C2, C9, and Z. It is assumed that battery characteristics are decreased similar to the above, by lithium deposition for samples C1, C2, and Z, and by phase separation of the negative electrode caused by heat treatment for sample C9.

According to these results, the method of imparting lithium to compensate for the irreversible capacity of the negative electrode is not limited to evaporation of lithium. Another way to form a lithium thin film and transfer the film onto the negative electrode is also effective. Also in this transfer, heat-treating the negative electrode before the transfer is extremely effective.

Next, a description is provided of a case where the atmosphere inside the furnace is changed in the B step of heat-treating the negative electrode before lithium impartment. In fabrication of negative electrodes 6 of samples D1, D2, and D3, the atmospheres inside the furnace during heat treatment are controlled to include nitrogen, a dry air, and a vacuum, respectively, in place of argon. Specifically, the atmosphere includes 99.99% of nitrogen for sample D1, and a dry air having a dew point of −60° C. for sample D2. For each of these samples, the atmosphere gas is supplied at a flow rate of 1 L/min. For sample D3, the furnace has an air atmosphere at a pressure of 10 Pa. Each negative electrode 6 is fabricated in the same manner as sample B4 except for the above atmosphere. Further, batteries are produced using negative electrodes 6 thus heat-treated.

After the procedure for imparting lithium is completed, negative electrode 6 of each sample is taken out in a dry air, and the appearance is evaluated by visual inspection. Table 7 shows the results thereof. Table 8 shows the results of battery characteristics evaluation.

TABLE 7

| Sample | Heat treatment atmosphere | State of negative electrode surface |
|---|---|---|
| D1 | Nitrogen | No lithium deposited |
| D2 | Dry air | Lithium deposited on ½ of entire surface |
| D3 | Vacuum | No lithium deposited |

Heat treatment temperature: 400° C.

TABLE 8

| Sample | Heat treatment atmosphere | Initial discharge capacity (mAh) | Cycle retention ratio (%) |
|---|---|---|---|
| D1 | Nitrogen | 2,000 | 94 |
| D2 | Dry air | 1,300 | 60 |
| D3 | Vacuum | 2,000 | 90 |

No problem occurred for sample D1 and D3 heat-treated in a nitrogen and vacuum atmosphere, respectively, both non-oxidizing atmospheres. For sample D2 heat-treated in a dry air, uneven distribution of lithium is observed on the surfaces of negative electrode 6. An SEM observation of this negative electrode shows that a large number of oxygen-rich layers are further formed on the surface of the negative electrode active material and the thickness thereof reaches 2.3 μm. It is considered that these oxygen-rich layers have hindered the diffusion of lithium. These results show that it is important to select a non-oxidizing atmosphere as the heat treatment atmosphere.

In the above examples, cylindrical batteries are used. However, the same advantages are offered when the batteries of other shapes, such as a prismatic battery, are used.

INDUSTRIAL APPLICABILITY

A nonaqueous electrolyte secondary battery using a negative electrode fabricated by the manufacturing method of the present invention has a large capacity and long life. Thus, this nonaqueous electrolyte secondary battery is useful for a driving source of electronic equipment, e.g. a notebook computer, portable telephone, and digital still camera, and further useful for a power supply for a power storage system or electric vehicle requiring high output. The present invention is an important and effective means for manufacturing such a nonaqueous electrolyte secondary battery.

The invention claimed is:

1. A method of manufacturing a negative electrode for a nonaqueous electrolyte secondary battery, the negative electrode capable of storing and releasing lithium ions, the method comprising:
   A) fabricating the negative electrode by depositing a negative electrode active material on a current collector, wherein the negative electrode active material is formed on the current collector as a plurality of negative electrode active material blocks having a columnar structure;
   B) heat-treating the negative electrode at a temperature sufficient for achieving a high cycle retention ratio; and
   C) imparting lithium to the negative electrode active material after step B,
   wherein silicon is deposited by a vacuum film-forming method and oxygen is introduced during the deposition, so that a silicon-containing oxide is deposited on the current collector as the negative electrode active material, in step A, and
   step B is performed in a range of 300° C. to 600° C. inclusive, in a non-oxidizing atmosphere.

2. The method of manufacturing a negative electrode for a nonaqueous electrolyte secondary battery according to claim 1, wherein the negative electrode active material blocks are formed to be inclined with respect to a direction of a thickness of the current collector.

3. The method of manufacturing a negative electrode for a nonaqueous electrolyte secondary battery according to claim 1, wherein the negative electrode active material blocks are formed into a wave shape in a direction perpendicular to a surface of the current collector on which the negative electrode active material blocks are to be formed, in step A.

4. The method of manufacturing a negative electrode for a nonaqueous electrolyte secondary battery according to claim 1, wherein lithium is melted in a vacuum atmosphere and evaporated onto a surface of the negative electrode in step C.

5. The method of manufacturing a negative electrode for a nonaqueous electrolyte secondary battery according to claim 1, wherein a lithium foil is faced and joined to the negative electrode in a non-oxidizing atmosphere so that lithium is transferred onto the negative electrode in step C.

6. The method of manufacturing a negative electrode for a nonaqueous electrolyte secondary battery according to claim 1, wherein steps A and B are performed in a same chamber.

7. The manufacturing method according to claim 1, wherein steps B and C are performed in a same chamber.

8. The method of manufacturing a negative electrode for a nonaqueous electrolyte secondary battery according to claim 1, wherein the negative electrode active material is formed into a thin film in step A.

9. The method of manufacturing a negative electrode for a nonaqueous electrolyte secondary battery according to claim 1, wherein an amount of lithium to be imparted in step C corresponds to an amount of compensation for an irreversible capacity of the negative electrode active material.

* * * * *